Jan. 22, 1963

R. H. LUDLAM 3,074,175

DISPLACEMENT TRANSDUCER

Filed March 14, 1960

INVENTOR.
RICHARD H. LUDLAM
BY Knox & Knox 3,074,175
DISPLACEMENT TRANSDUCER
Richard H. Ludlam, San Diego, Calif., assignor to The
Ryan Aeronautical Co., San Diego, Calif.
Filed Mar. 14, 1960, Ser. No. 14,608
7 Claims. (Cl. 33—125)

The present invention relates generally to measuring devices and more particularly to a displacement transducer.

The primary object of this invention is to provide a displacement transducer utilizing a strain gauge in an electrical resistance bridge circuit, having an indicator for direct reading of displacement, the strain gauge being mounted in a novel manner which facilitates the measurement of a large linear displacement by a transducer of extremely small size.

Another object of this invention is to provide a displacement transducer which is temperature compensated by a second strain gauge included in the bridge circuit.

Still another object of this invention is to provide a displacement transducer capable of very accurate measurement in various attitudes and applications under a wide range of operating conditions, the transducer having easily accessible bias means for adjustment to a zero reading when required.

A further object of this invention is to provide a displacement transducer which is extremely compact, self-contained and well proctected against damage in use.

Finally, it is an object to provide a displacement transducer of the aforementioned character which is simple and convenient to manufacture and use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Similar characters of reference indicate similar or identical elements and portions throughout the specification and throughout the views of the drawing.

Figure 1:
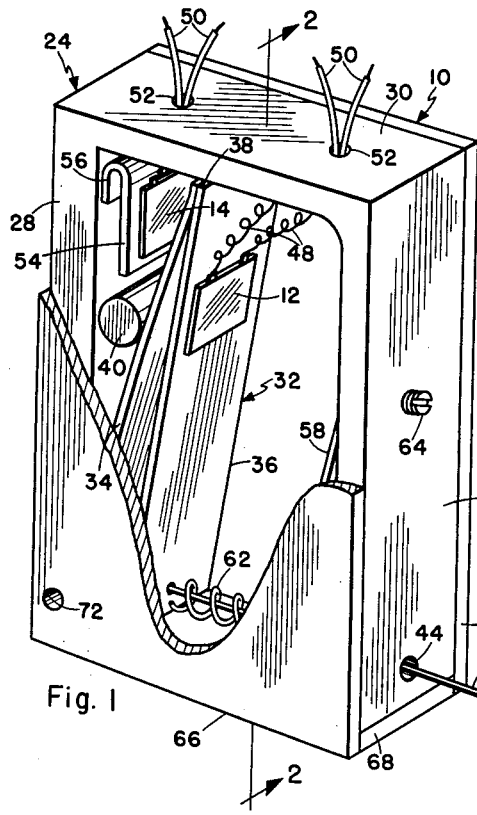
FIGURE 1 is a perspective view of the transducer with part of one cover plate cut away.

The displacement transducer 10, containing an active strain gauge 12 and a compensating strain gauge 14, is used in conjunction with an indicator 16 having a dial type meter 18, or similar readout device for direct indication. The indicator 16 contains half of a conventional bridge circuit having resistors 20 in two arms interconnected at one end to one side of a battery 22, or equivalent power supply, the meter 18 being connected between the other ends of said resistors. In the transducer 10, the strain gauges 12 and 14 comprise the other two arms of the bridge circuit and are each connected at one end to the meter 18, the other ends of said strain gauges being coupled to the other side of battery 22. Both of the strain gauges 12 and 14 are of the resistance grid or foil type which decrease in resistance in proportion to a bending imposed thereon, such strain gauges being well known and readily available.

The transducer 10 includes an inverted, generally U-shaped, rigid frame 24 having a front wall 26, a back wall 28 and a top wall 30, the designation of the walls being for convenience of description only. Inside the frame 24 is an active leaf assembly 32 which is compound or, in effect, folded on itself and comprising a first leaf 34 and a second leaf 36 which are generally coextensive and have fixedly interconnected upper ends, as indicated at 38. The lower end of the first leaf 34 is fixed to the lower portion of the back wall 28, and also fixed to said back wall is a fulcrum 40, which holds the first leaf clear of the back wall, said fulcrum being shown as constructed from a piece of cylindrical bar material for simplicity of manufacture. The fulcrum 40 is illustrated as being positioned slightly closer to the upper end of the back wall 28 than to the lower end, but the exact positioning may be varied.

The leaves 34 and 36 are both made from resilient sheet metal such as stainless steel or similar material, and are assembled in the manner illustrated to obtain the required bending characteristics. A primary factor in the design of the transducer is the ability to measure a large displacement with a mechanism of minimum size. In using a single spring leaf, the length must be considerable or bending is excessive and the useful life of the structure is greatly reduced, due to excessive bending of the leaf and material fatigue. By using a compound or folded leaf structure, bending is distributed over a considerably greater length of material in a minimum of space, part of the measured load being carried by the first leaf 34 and part by the leaf 36. Fixed to the lower end of the second leaf 36 is a pull rod 42 extending laterally through a guide opening 44 in the lower end of the front wall 26 and having a pull ring 46 formed in the free end thereof. When the pull rod 42 is pulled, a bending moment is impressed on the active leaf assembly 32 and the effect of positioning the fulcrum 40 as shown will be recognized as translating the effective point about which the bending occurs closer to the center of the transducer, so that the pull rod extends as closely as possible to the tangent to the arc executed by the unattached end of the second leaf 36, when the pull rod is moved during use of the instrument.

The active strain gauge 12 is fixed flat against the outer face of the second leaf 36 slightly below the interconnected upper ends 38, so that any bending of the leaf 36 is imparted to the strain gauge. The terminals of the active strain gauge 12 are connected by thin, flexible coupling leads 48 to heavier lead-out wires 50, which extend through an opening 52 in the top wall 30. The compensating strain gauge 14 may be conveniently mounted on a static leaf 54, having a return folded portion 56 which is fixed to the back wall 28 adjacent the upper end, said compensating strain gauge also being connected by thin coupling leads 48 to lead-out wires 50, which extend through a further opening 52 in the top wall 30. For security and to avoid breakage of the coupling leads 48, the lead-out wires 50 may be retained in any suitable manner, such as by a cementitious compound in the openings 52, or merely by being a tight fit since the transducer will not normally be subjected to rough usage.

The transducer 10 is made variable or adjustable by means of a resilient bias leaf 58, fixed at its upper end to the front wall 26 and having at its lower end a notch 60 which straddles the pull rod 42. Fitted over the pull rod 42 between the bias leaf 58 and the second leaf 36 is a coil type compression spring 62, to increase the load necessary to bend the leaf assembly 32. Various springs 62 may be used according to the required operating load of the transducer in a particular application, although the function being measured is linear displacement of the pull rod 42 rather than actual pull load. In order to provide adjustment to set the transducer to a zero position, or any other predetermined initial position, a bias screw 64 is inserted through the front wall 26 to engage the bias leaf 58 and impart an initial inward bend thereto.

For protective purposes, the frame 24 is enclosed by side plates 66 and a bottom plate 68, which may be welded in place since the transducer normally required no internal adjustment after assembly and is sufficiently low in cost to be discarded when damaged. In view of the small size of the structure, the various leaves may be held in place by spotwelds, indicated typically at 70, although screws or other securing means may be used. As an example of the small size and range of measurement, a transducer of approximately one inch high, eleven sixteenths of an inch wide and one quarter of an inch thick can be made to measure a linear displacement of a full half inch, with an accuracy limited only by the calibration of the indicator 16. However, these dimensions should not be considered as limiting, the structure being adaptable to many sizes of units.

Figure 2:
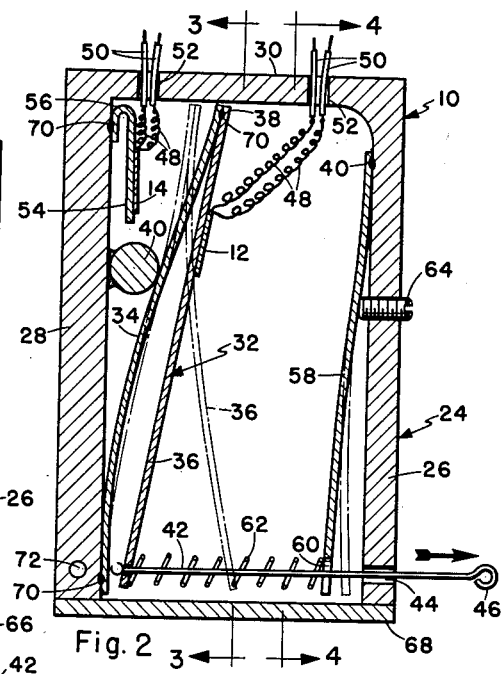
FIGURE 2 is a sectional view taken on the line 2—2 of FIGURE 1.
Figure 3:
FIGURE 3 is a sectional view taken on the line 3—3 of FIGURE 2.
Figure 4:
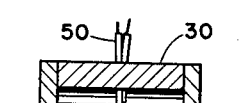
FIGURE 4 is a sectional view taken on the line 4—4 of FIGURE 2.
Figure 5:
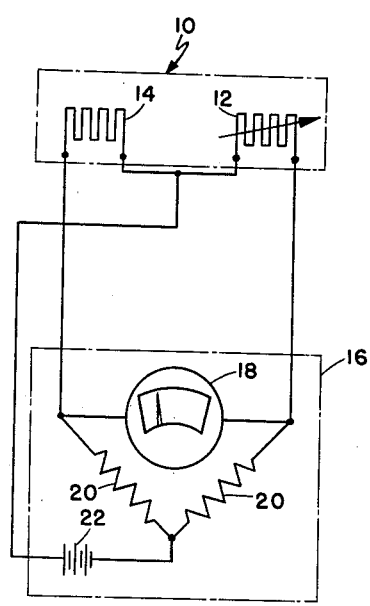
FIGURE 5 is a schematic wiring diagram of the transducer and associated indicating means.

In operation, the transducer 10 is attached to a convenient fixed structure or reference position, the back wall 28 and side plates 66 being provided with a transverse attachment hole 72 for this purpose, said attachment hole being generally coplanar with pull rod 42 for proper linear pull action. The lead-out wires 50 are connected in the appropriate manner to the indicator 16 to complete the bridge circuit, as in FIGURE 4, and the pull ring 46 is coupled in a suitable manner to the moving structure, the displacement of which is to be measured. Any linear displacement of the pull rod 42 is then imparted as a bending action of the active leaf assembly 32, as indicated in broken line in FIGURE 2, the bending changing the resistance of the active strain gauge 12 and being registered on the meter 18, which can be calibrated directly in linear increments or used with conversion tables. The compensating strain gauge 14, in the immediate vicinity of the active strain gauge 12, is subject to the same temperature changes and thus balances the bridge circuit for resistance variations due to temperature.

Many different uses for the transducer will be apparent, such as the measurement of mechanical movements, valve operations, actuator motions, to mention but a few. A great advantage of the strain gauge type transducer over more expensive equipments, such as a conventional dial indicator with mechanical action, is that the transducer need not be in direct contact with the moving part, but can be remotely positioned and coupled by a wire, cable or any other means between the moving part and the pull rod 42. Further, the transducer is relatively inexpensive and several may be connected to a single indicator assembly for multiple or selective use by switching. Also, the transducer may be coupled to various types of conventional readout devices used with resistance type strain gauges, such as in stress analysis applications.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. A displacement transducer, comprising: a rigid frame; a compound leaf assembly comprising two leaves having their adjacent ends affixed to each other to form a V-shaped assembly having one free end of said assembly fixed to said frame; a single electrical resistance type strain gauge operatively mounted on one of said leaves to detect bending thereof; and rigid connector means for connection of the other free end of said leaf assembly with a moving part being measured.

2. A transducer according to claim 1 wherein said connector means includes a rigid pull rod secured at one end thereof to said other free end of the leaf assembly, and extending from said frame through an opening in said frame.

3. A displacement transducer, comprising: a rigid frame; a compound leaf assembly, comprising a passive leaf and an active leaf having their adjacent ends affixed to each other to form a V-shaped assembly having one the free end of said passive leaf fixed to said frame; a single electrical resistance type strain gauge operatively mounted on one of said leaves adjacent the affixed end thereof to detect bending thereof; readout means operatively connected with said strain gauge; and rigid connector means connecting the free end of said active leaf of said assembly with a moving part whose movement is being measured, said connecting means extending through an opening in said frame.

4. A displacement transducer, comprising: a rigid frame; a compound leaf assembly, comprising a passive leaf and an active leaf having their adjacent ends affixed to each other to form a V-shaped assembly having one the free end of said passive leaf fixed to said frame; a single electrical resistance type strain gauge operatively mounted on said active leaf adjacent the affixed thereof to detect bending thereof; readout means operatively connected with said strain gauge; rigid connector means for connection of the free end of said active leaf with a moving part being measured; and an unstrained temperature compensating strain gauge mounted on said frame, said readout means comprising a resistance bridge circuit and said strain gauges constituting two arms of said resistance bridge circuit.

5. A displacement transducer, comprising: a rigid frame; a resilient V-shaped active leaf assembly having a first leaf and a second leaf fixed together at one pair of ends and being substantially coextensive; the free end of said first leaf being fixed to said frame; a rigid pull rod attached to the free end of said second leaf and extending through said frame; a single resistance type strain gauge operatively mounted on said second leaf adjacent the affixed end thereof; an element fixed to said frame and engaging said first leaf intermediate the ends thereof, and constituting a fulcrum about which said first leaf is flexed during use of the instrument; readout means operatively connected with said strain gauge; and adjustable, resilient biasing means engaging said second leaf said biasing means comprising a leaf having one end thereof affixed to said frame.

6. A displacement transducer according to claim 5, wherein said biasing means includes; an adjusting screw mounted in said frame and engaging said bias leaf to adjust the separation of the bias leaf from the frame; and a compression spring mounted between said bias leaf and said second leaf.

7. A displacement transducer, comprising: a rigid frame; a resilient active leaf assembly having a first leaf and a second leaf fixed together at one pair of ends and being substantially coextensive for forming a V-shaped assembly; the other end of said first leaf being fixed to said frame; a pull rod attached to the other end of said second leaf and extending through said frame; a single resistance type strain gauge operatively mounted on said second leaf; an element fixed to said frame and engaging said first leaf intermediate the ends thereof, and constituting a fulcrum about which said first leaf is flexed during use of the instrument; readout means operatively connected with said strain gauge; temperature compensating means in the form of a strain gauge identical with the first mentioned strain gauge and mounted on said frame; and said readout means including a Wheatstone bridge with said strain gauges connected therein in opposing relation.

References Cited in the file of this patent
UNITED STATES PATENTS

| | | |
|---|---|---|
| 2,344,642 | Ruge | Mar. 21, 1944 |
| 2,435,254 | Ramberg | Feb. 3, 1948 |
| 2,513,295 | Eisenberg | July 4, 1950 |
| 2,731,255 | Stelzer | Jan. 17, 1956 |
| 2,924,883 | Peterson et al. | Feb. 16, 1960 |